(12) United States Patent
Chang et al.

(10) Patent No.: US 8,385,929 B2
(45) Date of Patent: Feb. 26, 2013

(54) APPARATUS AND METHOD FOR OPERATING FEEDBACK CHANNELS IN A WIRELESS COMMUNICATION SYSTEM

(75) Inventors: Chung-Ryul Chang, Yongin-si (KR); June Moon, Seoul (KR); Jae-Hee Cho, Seoul (KR); Sung-Woo Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 861 days.

(21) Appl. No.: 12/231,690

(22) Filed: Sep. 5, 2008

(65) Prior Publication Data

US 2009/0068961 A1    Mar. 12, 2009

(30) Foreign Application Priority Data

Sep. 6, 2007    (KR) .................. 10-2007-0090310

(51) Int. Cl.
*H04W 72/00*    (2009.01)

(52) U.S. Cl. ................. 455/450; 455/452.1; 455/509

(58) Field of Classification Search .......... 455/450–453, 455/509

See application file for complete search history.

(56) References Cited

U.S. PATENT DOCUMENTS

| | | | |
|---|---|---|---|
| 6,791,961 B2* | 9/2004 | Zeira et al. ............... | 370/335 |
| 7,924,809 B2* | 4/2011 | Yin et al. ................ | 370/351 |
| 2003/0148770 A1 | 8/2003 | Das et al. | |
| 2004/0214602 A1* | 10/2004 | Aoyama ................ | 455/561 |
| 2005/0111492 A1* | 5/2005 | Kang et al. .............. | 370/480 |
| 2006/0256805 A1* | 11/2006 | Cho et al. ............... | 370/431 |

FOREIGN PATENT DOCUMENTS

| | | |
|---|---|---|
| KR | 1020050044219 A | 5/2005 |
| KR | 1020060078880 A | 7/2006 |
| KR | 100751509 B1 | 8/2007 |

* cited by examiner

*Primary Examiner* — Raymond Dean (57) ABSTRACT

An apparatus and a method for allocating feedback channels in a wireless communication system are provided. The method includes determining a number of common feedback channels to be allocated commonly to one or more terminals using a capacity loss according to the feedback channel allocation; and generating feedback channel change information to change the number of the common feedback channels per terminal.

21 Claims, 9 Drawing Sheets

APPARATUS AND METHOD FOR OPERATING FEEDBACK CHANNELS IN A WIRELESS COMMUNICATION SYSTEM

CROSS-REFERENCE TO RELATED APPLICATION(S) AND CLAIM OF PRIORITY

This application claims priority under 35 U.S.C. §119(a) to a Korean patent application filed in the Korean Intellectual Property Office on Sep. 6, 2007 and assigned Serial No. 2007-90310, the entire disclosure of which is hereby incorporated by reference.

TECHNICAL FIELD OF THE INVENTION

The present invention relates to an apparatus and a method for operating feedback channels of a wireless communication system. More particularly, the present invention relates to an apparatus and a method for maximizing a multi-user diversity gain and minimizing the number of feedback channels in the wireless communication system.

BACKGROUND OF THE INVENTION

A rapid growth of the wireless mobile communication market leads to various multimedia services in a wireless environment. To provide various multimedia services, recent researches have been conducted on communication schemes for transmitting data at a high data rate. For example, an Orthogonal Frequency Division Multiplexing (OFDM) communication scheme is being developed.

Using the OFDM scheme, the wireless communication system enables a high-speed data transmission beyond multiple delays of the channel by dividing a wide frequency band into a plurality of narrow bands.

Using the OFDM scheme, the wireless communication system allocates resource such that one user occupies one narrow band.

To raise frequency utilization, the wireless communication system may adopt an Orthogonal Frequency Division Multiple Access (OFDMA) scheme which lets a plurality of users to divide and use one narrow band.

Using the OFDMA scheme, the wireless communication system can maximize a multi-user diversity gain by allocating the frequency band on a user basis.

Accordingly, a base station of the OFDMA wireless communication system schedules in consideration of the multi-user diversity gain. For the scheduling based on the multi-user diversity gain, the base station requires instantaneous channel information of terminals in its service area. For doing so, the terminals send their instantaneous channel information to the base station over an uplink feedback channel.

Since the wireless communication system is subject to the limited radio resources, the uplink feedback channels allocated from the base station to the terminals act as an overhead onto the wireless communication system.

As the number of the serviced terminals increases in the wireless communication system, the amount of the feedback channels allocated to the terminals also increases. As a result, the overhead due to the feedback channels further increases.

SUMMARY OF THE INVENTION

To address the above-discussed deficiencies of the prior art, it is a primary object of the present invention to address at least the above mentioned problems and/or disadvantages and to provide at least the advantages described below. Accordingly, an aspect of the present invention is to provide an apparatus and a method for operating feedback channels in a wireless communication system.

Another aspect of the present invention is to provide an apparatus and a method for operating feedback channels to maximize a multi-user diversity gain and minimize the number of feedback channels in a wireless communication system.

Yet another aspect of the present invention is to provide an apparatus and a method for operating feedback channels to maximize a cell capacity under a limited feedback overhead in a wireless communication system.

Still another aspect of the present invention is to provide an apparatus and a method for a transmitting stage of a wireless communication system to transmit a common feedback channel using a common control message and increase/decrease information of the common feedback channel per user using a separate control message.

The above aspects are achieved by providing a method for allocating feedback channels in a wireless communication system. The method includes determining a number of common feedback channels to be allocated commonly to one or more terminals using a capacity loss according to the feedback channel allocation; and generating feedback channel change information to change the number of the common feedback channels per terminal.

According to one aspect of the present invention, a method for transmitting channel information in a wireless communication system includes confirming feedback channel information from a broadcast signal received from a serving base station; checking whether feedback channel change information is received from the serving base station or not; when receiving the feedback channel change information, confirming feedback channels allocated by the serving base station using the feedback channel information and the feedback channel change information; and transmitting channel information to the serving base station over the feedback channels.

According to another aspect of the present invention, an apparatus for allocating feedback channels in a wireless communication system includes a feedback controller for determining a number of common feedback channels to be allocated commonly to one or more terminals using a capacity loss according to the feedback channel allocation, and generating feedback channel change information to change the number of the common feedback channels per terminal; and a transmitter for transmitting the number of the common feedback channels and the feedback channel change information to the terminals.

According to yet another aspect of the present invention, an apparatus for feeding back channel state information at a receiving stage in a wireless communication system includes a receiver for receiving a signal from a serving base station; a channel estimator for estimating a channel using the signal received through the receiver; a controller for confirming feedback channels using feedback channel information of a broadcast signal received from the receiver and feedback channel change information of a control signal, and controlling to transmit channel information over the feedback channels; and a transmitter for transmitting the channel information to the serving base station under the control of the controller.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a feedback channel operating technique for maximizing a cell capacity within a limited feedback overhead in a wireless communication system. Particularly, the present invention provides a technique for operating the feedback channels to maximize the cell capacity while not raising a feedback overhead even when the number of terminals to be serviced increases in the wireless communication system.

Hereinafter, while the wireless communication system adopts an Orthogonal Frequency Division Multiple Access (OFDMA) scheme by way of example, the present invention is applicable to other multi-carrier wireless communication systems.

Figure 1:
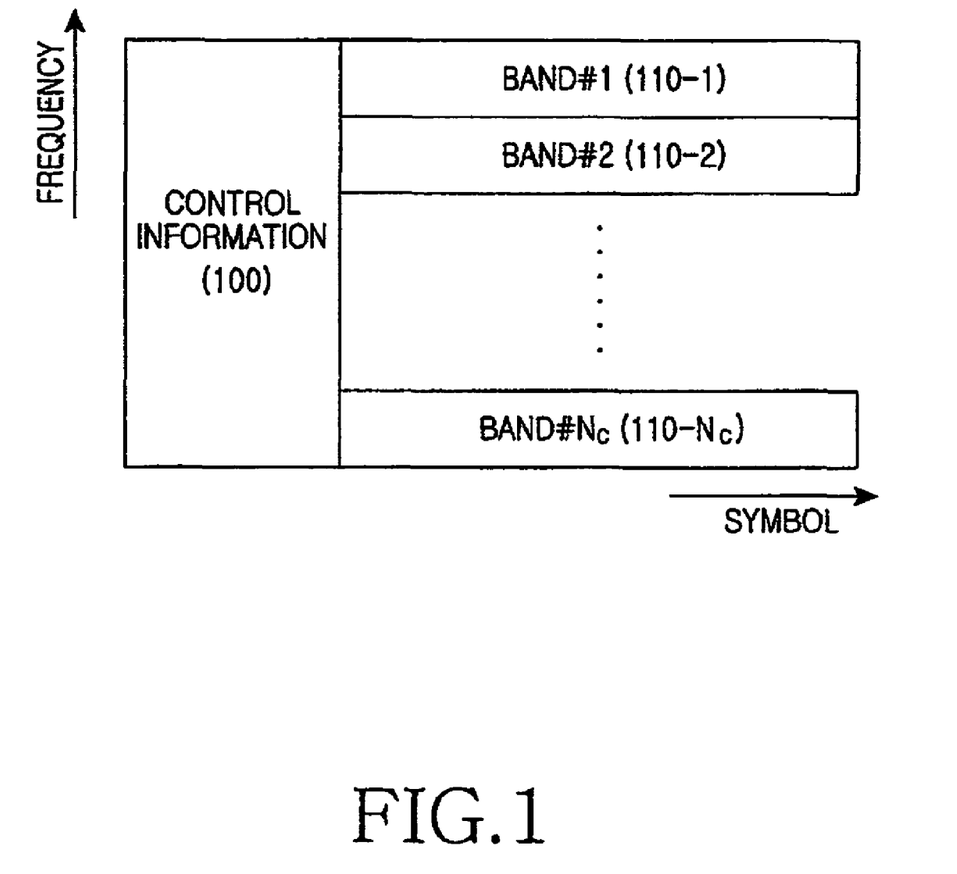
FIG. 1 illustrates a frame structure of a wireless communication system according to an exemplary embodiment of the present invention.

The wireless communication system is assumed to divide a downlink data transmission interval into $N_c$-ary bands as shown in FIG. 1. Herein, the band indicates a frequency-domain data allocation unit. Terminals feed back their channel state by the bands.

FIG. 1 illustrates a frame structure of a wireless communication system according to an exemplary embodiment of the present invention. A downlink subframe for using a band adaptive modulation and coding (AMC) is illustrated for example.

The downlink subframe of FIG. 1 includes a first interval 100 for carrying control information and a second interval 110 for carrying DownLink (DL) data.

The first interval 100 contains resource allocation information of the second interval 110 and feedback channel information of terminals. The first interval 100 includes a common control channel and a separate control channel for carrying the feedback channel information. Herein, the common control channel delivers feedback channel allocation information with respect to the number of feedback channels common to the terminals in the service coverage. The separate control channel delivers increase/decrease information of the feedback channels of each terminal. For example, the base station broadcasts the feedback channel allocation information relating to the number of the feedback channels common to the terminals over the common control channel of the first interval 100. The base station transmits the increase/decrease information of the feedback channels of each terminal over the separate control channel of the first interval 100.

The second interval 110 carries DL data and is subdivided into $N_c$-ary bands.

The following descriptions explain operations of the base station for determining feedback channels to be allocated to terminals in the service coverage using the $N_c$-ary bands.

Figure 2:
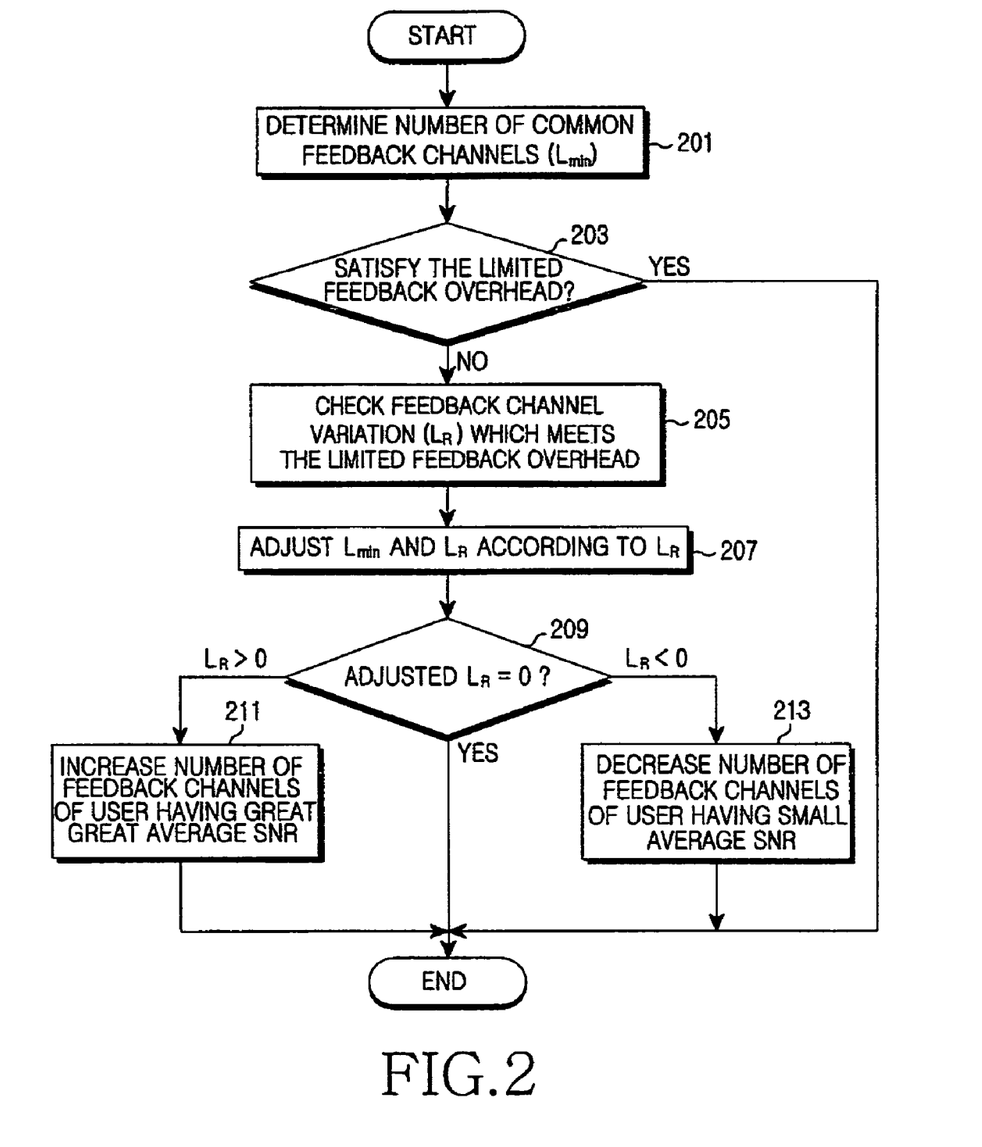
FIG. 2 illustrates a method for allocating feedback channels at a base station in the wireless communication system according to an exemplary embodiment of the present invention.

FIG. 2 is a flowchart illustrating a method for allocating feedback channels at the base station in the wireless communication system according to an exemplary embodiment of the present invention.

In step 201, the base station determines the minimum number of common feedback channels ($L_{min}$) to be allocated to the terminals traveling in the service coverage so as to satisfy its desired cell capacity. Herein, the base station determines the number of the common feedback channels based on Equation 1:

$$L_{min} = \text{ceil}\left(\left(1 - (R_{loss})^{\frac{1}{N}}\right) \cdot N_C\right). \qquad \text{[Eqn. 1]}$$

In Equation 1, $L_{min}$ denotes the number of common feedback channels to be allocated to the terminals, $R_{loss}$ denotes a capacity loss due to the feedback channels allocated to the terminals, N denotes the number of terminals assigned the feedback channels, and $N_c$ denotes the number of bands belonging to the DL data transmission interval. ceil(f(A)) denotes the smallest integer among integers greater than a function f(A). Herein, $R_{loss}$ employs a target capacity loss predefined by a system parameter.

Based on Equation 1, the base station determines the number of the common feedback channels to be allocated to the terminals using the capacity loss due to the feedback channels allocated to the terminals. For example, when the terminals feed back channel information relating to L-ary bands of good channel conditions, the base station can calculate the approximated cell capacity based on Equation 2:

$$C_{best}(L, N) = P_{outage} \cdot C_{optimal}(N) \qquad \text{[Eqn. 2]}$$

$$R_{loss} = P_{outage} = \left(1 - \left(1 - \frac{L}{N_C}\right)^N\right).$$

In Equation 2, $C_{best}(L,N)$ denotes a cell capacity when N-ary terminals feed back channel information relating to L-ary bands of good channel conditions, $P_{outage}$ denotes a scheduling outage, and $C_{optimal}$ denotes an optimal cell capacity of the N-ary terminals. $R_{loss}$ denotes a capacity loss according to the feedback channels, $N_c$ denotes the number of bands belonging to the DL data transmission interval, N denotes the number of terminals to be allocated the feedback channels, and L denotes the number of bands for the terminals to feed back the channel information at one time.

The cell capacity according to the feedback channels is determined by the scheduling outage $P_{outage}$ in Equation 2. Since the scheduling outage $P_{outage}$ is equal to the capacity loss $R_{loss}$, the cell capacity can be determined by the capacity loss according to the feedback channels.

Thus, the base station can determine the number of the common feedback channels by applying the capacity loss determined by the system parameter into Equation 1.

In step 203, the base station determines whether the feedback overhead when the common feedback channels are allocated to the terminals satisfies a feedback overhead limited by the system. More specifically, when the feedback overhead when the base station allocates the common feedback channels to the terminals is equal to the feedback overhead limited by the system, the base station determines that the feedback overhead limited by the system is satisfied. Herein, the feedback overhead limited in the system indicates the feedback overhead limited to meet its desired cell capacity of the base station. That is, when the base station allocates the feedback channels to meet the feedback overhead limited by the system, the base station can satisfy its intended cell capacity.

The base station can calculate the feedback overhead based on Equation 3:

$$F(L, N) = \qquad \text{[Eqn. 3]}$$

$$N \cdot \frac{1}{D} \cdot L \cdot (\text{ceil}(\log_2(N_{CINR})) + \text{ceil}(\log_2(N_C)) + \text{ceil}(\log_2(N_{CB}))).$$

In Equation 3, F(L,N) denotes a feedback overhead when N-ary terminals feed back channel information of L-ary bands, N denotes the number of the terminals which feed back the channel information, and L denotes the number of bands which the terminals feed back. $N_{CINR}$ denotes a carrier to interference and noise ratio (CINR) step number, and $N_c$ denotes the number of the bands. $N_{CB}$ denotes a codebook index number when a closed-loop transmission scheme is employed. Not using the closed-loop transmission scheme, $N_{CB}$ is 1. ceil(f(A)) denotes the smallest integer among integers greater than a function f(A).

When the feedback overhead limited by the system is satisfied in the common feedback channel allocation to the terminals in step 203, the base station finishes this process. In more detail, when allocating the common feedback channels to the terminals, the base station determines that its intended cell capacity can be acquired and thus finishes this process.

By contrast, when the feedback overhead limited by the system is not satisfied in the common feedback channel allocation to the terminals in step 203, the base station calculates a variation of the feedback channels ($L_R$) to meet the feedback overhead limited by the system in step 205. For example, when the feedback overhead in the common feedback channel allocation is greater than the feedback overhead limited by the system, the base station determines that the number of the feedback channels allocated to the terminals is greater. Hence, the base station calculates the number of the feedback channels to reduce the number of the common feedback channels allocated to the terminals. By contrast, when the feedback overhead in the common feedback channel allocation is less than the feedback overhead limited by the system, the base station calculates the number of the feedback channels to increase the number of the common feedback channels allocated to the terminals. The base station calculates the variation of the feedback channel based on Equation 4:

$$L_R = \frac{F_{limit} - F(L_{min}, N)}{F_u}, \; F_u = F(L=1, N=1). \qquad \text{[Eqn. 4]}$$

In Equation 4, $L_R$ denotes a variation of the feedback channels, $F_{limit}$ denotes a minimum value of the feedback overhead, $F(L_{min},N)$ denotes a feedback overhead when $L_{min}$-ary feedback channels are allocated to N-ary terminals, and $F_u$ denotes a feedback overhead when one feedback channel is allocated to one terminal.

Based on Equation 4, the base station calculates the variation of the feedback channels to be increased or decreased from the total number of the feedback channels to be allocated to the terminals so as to meet the limited feedback overhead.

In step 207, the base station updates the number of the common feedback channels according to the variation of the feedback channels to allocate the feedback channels by taking into account fairness of users. Herein, the base station updates the number of the common feedback channels based on Equation 5:

$$L_{min_{new}} = L_{min} + \text{floor}\left(\frac{L_R}{N}\right) \qquad \text{[Eqn. 5]}$$

$$L_{R_{new}} = L_R - N \cdot \text{floor}\left(\frac{L_R}{N}\right).$$

In Equation 5, $L_{min_{new}}$ denotes the number of updated common feedback channels allocated to the terminals, $L_{min}$ denotes the number of common feedback channels allocated to the terminals, $L_{R_{new}}$ denotes a variation of the updated feedback channels, $L_R$ denotes a variation of the feedback channels, N denotes the number of the terminals to which feedback channels are allocated, and floor(f(A)) denotes the largest integer among integers smaller than a function f(A).

The variation of the feedback channels acquired based on Equation 4 signifies the variation of the feedback channels when the common feedback channels are allocated to the terminals. As expressed in Equation 5, the base station updates the number of the common feedback channels by calculating the variation of the feedback channels $$\left(\text{floor}\left(\frac{L_R}{N}\right)\right)$$

to change the feedback channels of each terminal.

Since the base station equally updates the number of the common feedback channels with respect to each terminal for the sake of the fairness of the terminals, there can be remaining variation of the feedback channels which are not added to or removed from the terminals. For example, when there are four terminals and the variation of the feedback channels is five (5), the base station adds one feedback channel to the number of the common feedback channels. In this case, the variation of one feedback channel not yet allocated remains. Accordingly, the base station updates the feedback channel variation $L_R$ according to the variation of the common feedback channels based on Equation 5.

In step 209, the base station checks the updated variation of the feedback channels.

When the updated variation of the feedback channels is zero, the base station determines that the allocation of the updated common feedback channels to the terminals meets the feedback overhead limited by the system and thus finishes this process. In other words, as allocating the updated common feedback channels to the terminals, the base station determines that its intended cell capacity can be acquired and thus finishes this process.

By contrast, when the updated variation of the feedback channels is greater than zero, the base station determines that there exist feedback channels additionally allocable to the terminals in step 211. The base station additionally allocates the feedback channels to the terminals by taking into account the channel condition of the terminals. For example, to allocate the resources first to a terminal having the best channel state through the scheduling, the base station additionally allocates the feedback channel to the terminal having the best average channel condition (e.g., signal to noise ratio (SNR)). In doing so, given a plurality of feedback channels additionally allocable, the base station can additionally allocate one feedback channel first to the terminal having the best average channel condition in order.

When the variation of the feedback channel updated in step 209 is less than zero, the base station determines that too many feedback channels are allocated to the terminals in step 213. Hence, the base station de-allocates some feedback channels of the terminals by considering the channel state of the terminals. For example, to allocate the resources first to a terminal having the best channel condition through the scheduling, the base station de-allocates one of feedback channels allocated to the terminal having the worst average channel condition (e.g., SNR). In doing so, when the feedback channels are excessively allocated to the terminals, the base station can de-allocate one feedback channel of the terminal having the worst average channel condition in order.

Next, the base station finishes this process.

Figure 3:
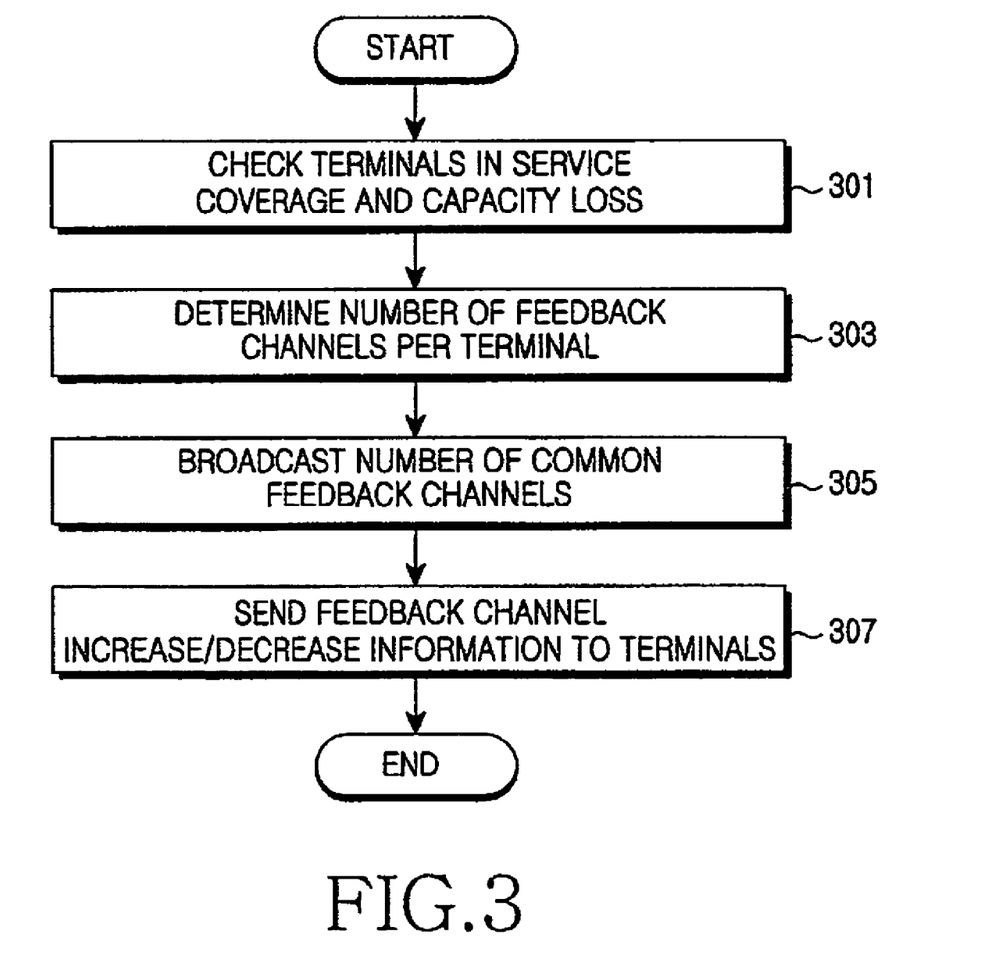
FIG. 3 illustrates a method for transmitting feedback channel information at the base station in the wireless communication system according to an exemplary embodiment of the present invention.

After determining the feedback channels to be allocated to the terminals as above, the base station transmits allocation information of the feedback channels to the terminals as shown in FIG. 3.

FIG. 3 is a flowchart illustrating a method for transmitting feedback channel information at the base station in the wireless communication system according to an exemplary embodiment of the present invention.

In step 301, the base station checks the number of active terminals N in the service coverage and the target capacity loss $R_{less}$ which is the system operating parameter.

In step 303, the base station determines the number of feedback channels to be allocated to the terminals. More specifically, the base station calculates the common feedback channels using the target capacity loss as shown in FIG. 2. Next, the base station determines the number of feedback channels of each terminal to maximize the cell capacity by comparing the feedback overhead when the common feedback channels are allocated to the terminals with the feedback overhead limited by the system.

In step 305, the base station broadcasts the information of the common feedback channels to be allocated to the terminals, to the terminals. For example, the base station broadcasts the common feedback channel information to the terminals over the common control channel of the first interval 100 of FIG. 1.

In step 307, the base station transmits the increase/decrease information of the feedback channels of each terminal to the terminals. That is, the base station transmits the increase/decrease information of the feedback channels only for the terminals assigned the feedback channels through the scheduling. For example, the base station sends the increase/decrease information of the feedback channel of each terminal over the separate control channel of the first interval 100 of FIG. 1.

Next, the base station finishes this process.

As above, the base station separately sends the common feedback channel information of the terminals and the feedback channel increase/decrease information of the terminals over the common control channel and the separate control channel respectively. The common control channel is ceil ($\log_2(L_{MAX})$) in size to carry the common feedback channel information. The separate control channel is two (2) bits in size to carry "−1", "0", or "1" feedback channel increase/decrease information per terminal. Herein, $L_{MAX}$ denotes the number of bands $N_c$ belonging to the DL data transmission interval.

Alternatively, when the base station sets the number of the common feedback channels to the minimum value or the maximum value of the feedback channels allocated to the terminals, the separate control channel may be one (1) bit in size to carry "−1" or "1" feedback channel increase/decrease information per terminal.

Now, descriptions provide operations of the terminal for confirming the feedback channel information received from the base station over the common control channel and the separate control channel.

Figure 4:
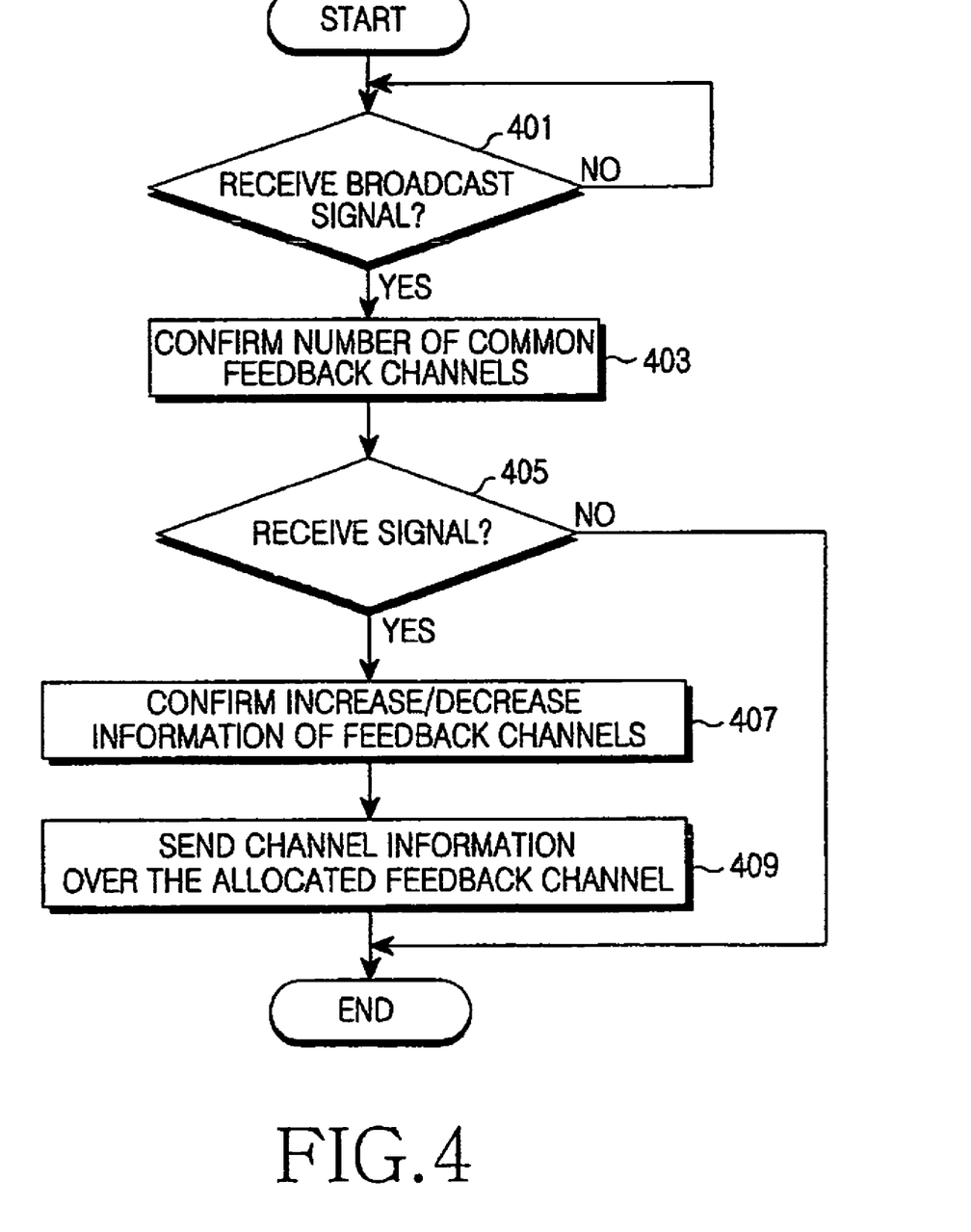
FIG. 4 illustrates a method for feeding back channel information at a terminal in the wireless communication system according to an exemplary embodiment of the present invention.

FIG. 4 is a flowchart illustrating a method for feeding back channel information at the terminal in the wireless communication system according to an exemplary embodiment of the present invention.

In step 401, the terminal checks whether a broadcast signal is received from its serving base station.

When receiving the broadcast signal, the terminal confirms the common feedback channel information of the broadcast signal in step 403.

In step 405, the terminal checks whether a signal is received from the serving base station. More specifically, the terminal checks whether a control signal including the resource allocation information is received from the serving base station.

When not receiving the control signal including the resource allocation information over a certain time, the terminal recognizes that it is not allocated the feedback channel and thus finishes this process.

When receiving the control signal including the resource allocation information, the terminal confirms the feedback channel increase/decrease information of the control signal in step 407. Next, the terminal identifies the feedback channel allocated from the base station using the common feedback channel and the feedback channel increase/decrease information.

In step 409, the terminal feeds its channel state information back to the serving base station over the allocated feedback channel.

Next, the terminal finishes this process.

Hereafter, a structure of the base station for allocating the feedback channels to maximize the cell capacity within the limited feedback overhead in the wireless communication system is explained.

Figure 5:
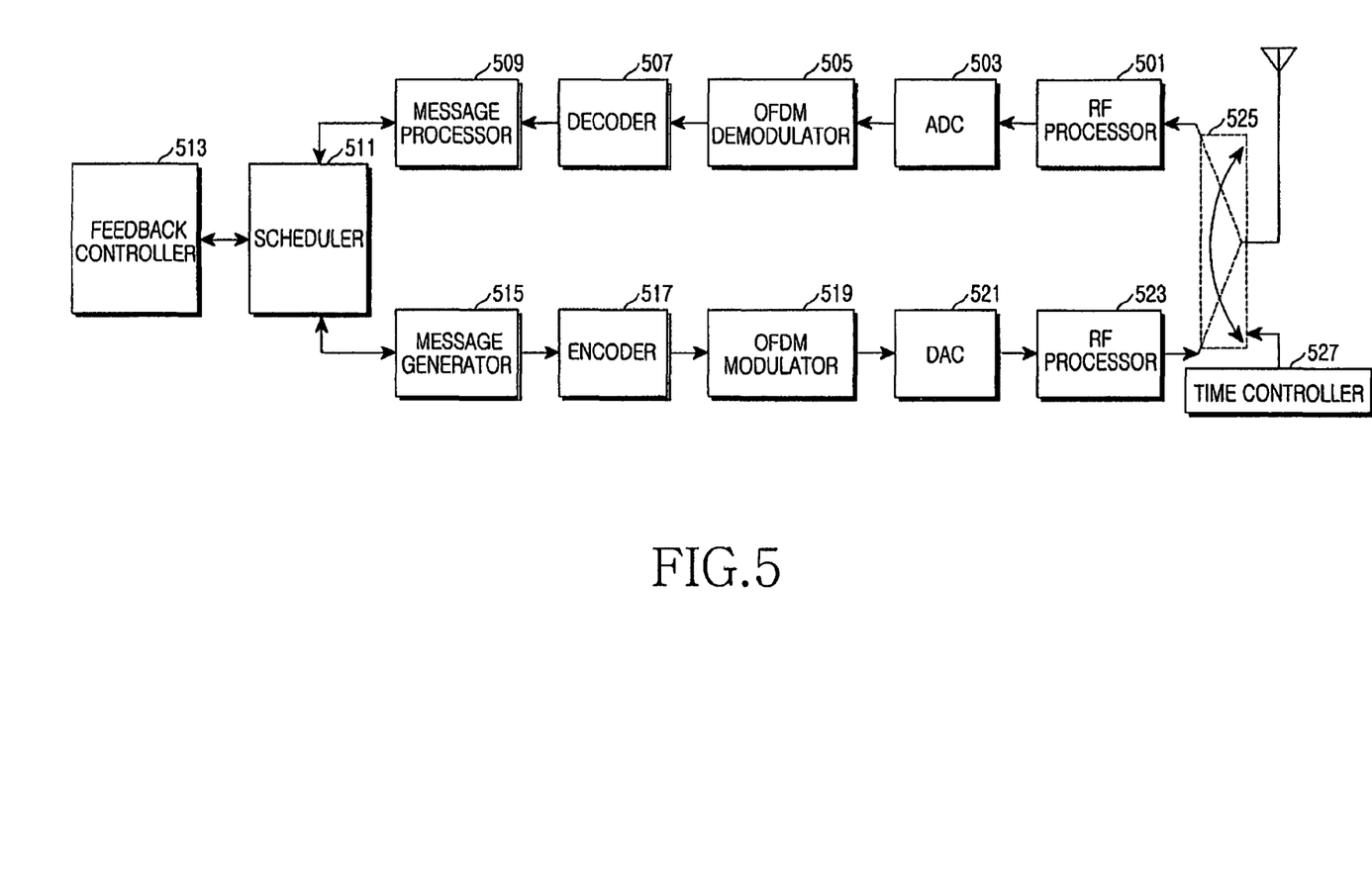
FIG. 5 illustrates the base station for controlling the feedback channels in the wireless communication system according to an exemplary embodiment of the present invention.

FIG. 5 is a block diagram of the base station for controlling the feedback channels in the wireless communication system according to an exemplary embodiment of the present invention.

The base station of FIG. 5 includes a Radio Frequency (RF) processor 501, an analog/digital converter (ADC) 503, an OFDM demodulator 505, a decoder 507, a message processor 509, a scheduler 511, a feedback controller 513, a message generator 515, an encoder 517, an OFDM modulator 519, a digital/analog converter (DAC) 521, an RF processor 523, a switch 525, and a time controller 527.

The timer controller 527 controls a switching operation of the switch 525 based on a frame synchronization. For example, in the signal reception, the time controller 527 controls the switch 525 to connect an antenna to the RF processor 501 of the receiving stage. In the signal transmission, the time controller 527 controls the switch 525 to connect the antenna to the RF processor 523 of the transmitting stage.

In the reception interval, the RF processor 501 converts an RF signal received via the antenna to a baseband analog signal. The ADC 503 converts the analog signal output from the RF processor 501 to sample data. The OFDM demodulator 505 outputs frequency-domain data by Fast Fourier Transform (FFT)-processing the sample data output from the ADC 503.

The decoder 507 selects data of subcarriers to be actually received from the frequency-domain data output from the OFDM demodulator 505. Next, the decoder 507 demodulates and decodes the selected data according to a preset modulation level. Herein, the modulation level indicates a Modulation and Coding Scheme (MCS) level.

The message processor 509 decomposes the control message provided from the decoder 507 and provides the result to the scheduler 511. For example, the message processor 509 provides the channel information acquired from the feedback signal received from the terminals traveling in the service coverage, to the scheduler 511.

The scheduler 511 selects terminals to service through the scheduling using the channel information of the terminals provided from the message processor 509.

The feedback controller 513 determines the feedback channels to be allocated to the terminals using the number of the terminals traveling in the service coverage and the target capacity loss which is the system operating parameter. For example, the feedback controller 513 determines the number of the common feedback channels using the target capacity loss to meet the feedback overhead limited by the system as shown in FIG. 2. Next, when there exists the variation of the feedback channel, the feedback controller 513 determines the feedback increase/decrease information of each terminal. More specifically, when the variation of the feedback channel is greater than zero, the feedback controller 513 additionally allocates the feedback channels to the terminals by taking into account the channel conditions of the terminals. When the variation of the feedback channels is less than zero, the feedback controller 513 de-allocates some feedback channels of the terminals based on the channel conditions of the terminals.

The message generator 515 generates a message including the scheduling information provided from the scheduler 511. The message generator 515 generates a message for carrying the feedback channel information determined at the feedback controller 513. In doing so, the message generator 515 generates a common control message to be broadcast over the common control channel, and a separate control message sent to the terminals in the separate control channel. For example, the message generator 515 generates a common control message including the information relating to the common feedback channels to be allocated to the terminals, which is provided from the feedback controller 513. The message generator 515 generates a separate control message including the increase/decrease information of the common feedback channels of the terminals, which is provided from the feedback controller 513.

The encoder 517 encodes and modulates the message output from the message generator 515 according to a corresponding modulation level. The OFDM modulator 519 outputs sample data (OFDM symbols) by Inverse FFT (IFFT)-processing the frequency-domain data output from the encoder 517.

The DAC 521 converts the sample data output from the OFDM modulator 519 to an analog signal. The RF processor 523 converts the analog signal output from the DAC 521 to an RF signal and transmits the RF signal over the antenna.

As constructed above, the scheduler 511 controls the message processor 509, the feedback controller 513, and the message generator 515. Namely, the scheduler 511 can function as the message processor 509, the feedback controller 513, and the message generator 515. They are separately provided here to distinguish their functions. In the actual implementation, the scheduler 511 can process all or part of the message processor 509, the feedback controller 513, and the message generator 515.

The following explanations describe a structure of the terminal for confirming the feedback channel information received from the base station over the common control channel and the separate control channel.

Figure 6:
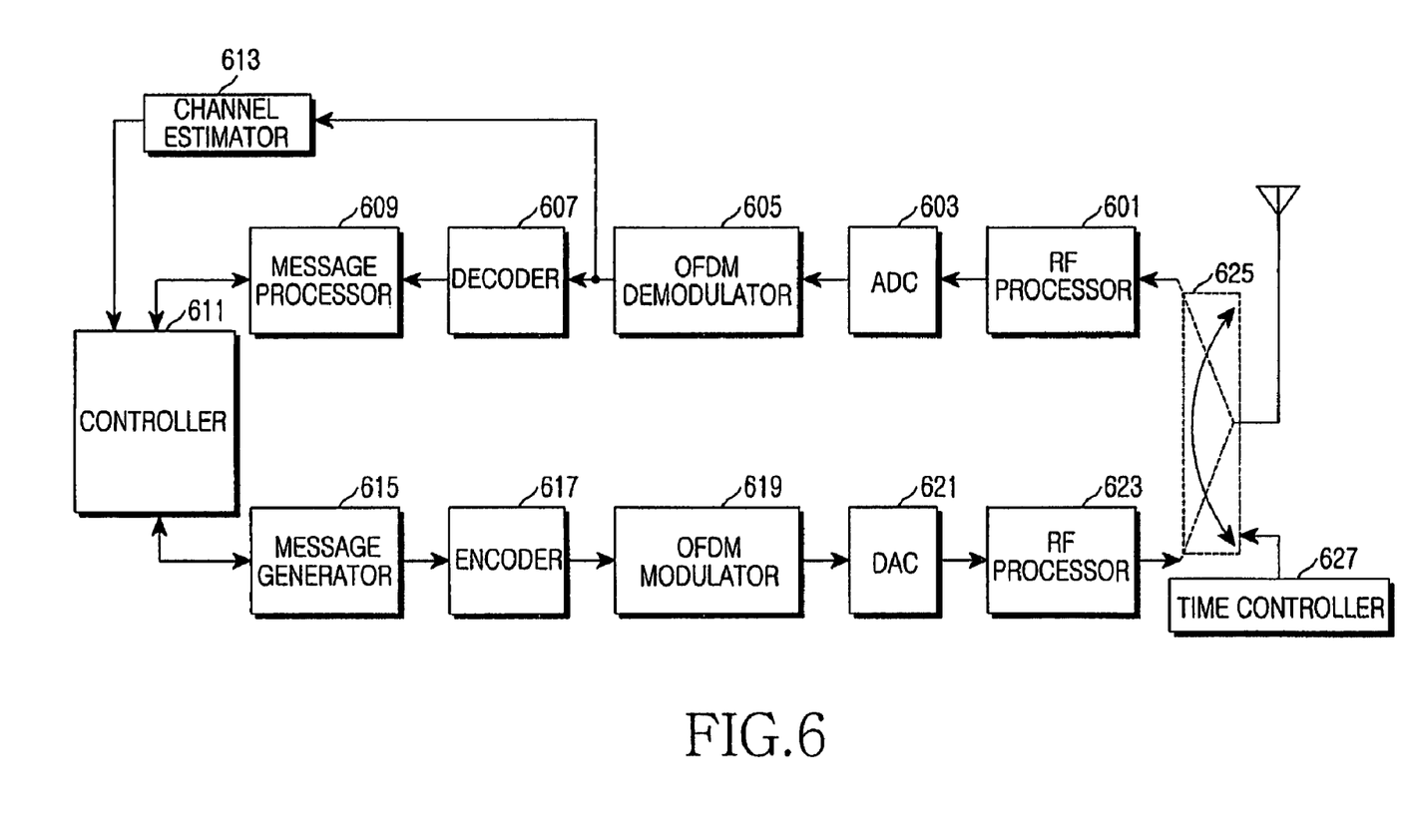
FIG. 6 illustrates the terminal for feeding back the channel information in the wireless communication system according to an exemplary embodiment of the present invention.

FIG. 6 is a block diagram of the terminal for feeding back the channel information in the wireless communication system according to an exemplary embodiment of the present invention.

The terminal of FIG. 6 includes an RF processor 601, an ADC 603, an OFDM demodulator 605, a decoder 607, a message processor 609, a controller 611, a channel estimator 613, a message generator 615, an encoder 617, an OFDM modulator 619, a DAC 621, an RF processor 623, a switch 625, and a time controller 627.

The timer controller 627 controls a switching operation of the switch 625 based on a frame synchronization. For example, in the signal reception, the time controller 627 controls the switch 625 to connect an antenna to the RF processor 601 of the receiving stage. In the signal transmission, the time controller 627 controls the switch 625 to connect the antenna to the RF processor 623 of the transmitting stage.

In the reception interval, the RF processor 601 converts an RF signal received via the antenna to a baseband analog signal. The ADC 603 converts the analog signal output from the RF processor 601 to sample data. The OFDM demodulator 605 outputs frequency-domain data by FFT-processing the sample data output from the ADC 603.

The decoder 607 selects data of subcarriers to be actually received from the frequency-domain data output from the OFDM demodulator 605. Next, the decoder 607 demodulates and decodes the selected data according to the preset modulation level.

The message processor 609 decomposes the control message provided from the decoder 607 and provides the result to the controller 611. For example, the message processor 609 confirms the common feedback channel information received in the common control channel and the feedback channel increase/decrease information received in the separate control channel and provides the confirmed information to the controller 611.

The controller 611 identifies the feedback channel allocated from the serving base station using the feedback channel information provided from the message processor 609. For example, when the message processor 609 provides only the common feedback channel information, the controller 611 recognizes that no feedback channel is allocated. Thus, the controller 611 controls not to feed its channel state information back to the serving base station. By contrast, when the message processor 609 provides the common feedback channel information and the feedback channel increase/decrease information, the controller 611 identifies the feedback channel allocated from the serving base station using the common feedback channel information and the feedback channel increase/decrease information. Next, the controller 611 controls to send the channel state information provided from the channel estimator 613 over the feedback channel allocated by the serving base station.

The channel estimator 613 estimates channel information in relation with the serving base station using the frequency-domain signal output from the OFDM demodulator 615 and provides the estimated channel information to the controller 611.

The message generator 615 generates a message including the channel state information output from the controller 611.

The encoder 617 encodes and modulates the message output from the message generator 615 according to the corresponding modulation level. The OFDM modulator 619 outputs sample data (OFDM symbols) by IFFT-processing the frequency-domain data output from the encoder 617.

The DAC 621 converts the sample data output from the OFDM modulator 619 to an analog signal. The RF processor 623 converts the analog signal output from the DAC 621 to an RF signal and transmits the RF signal over the antenna.

Figure 7A:
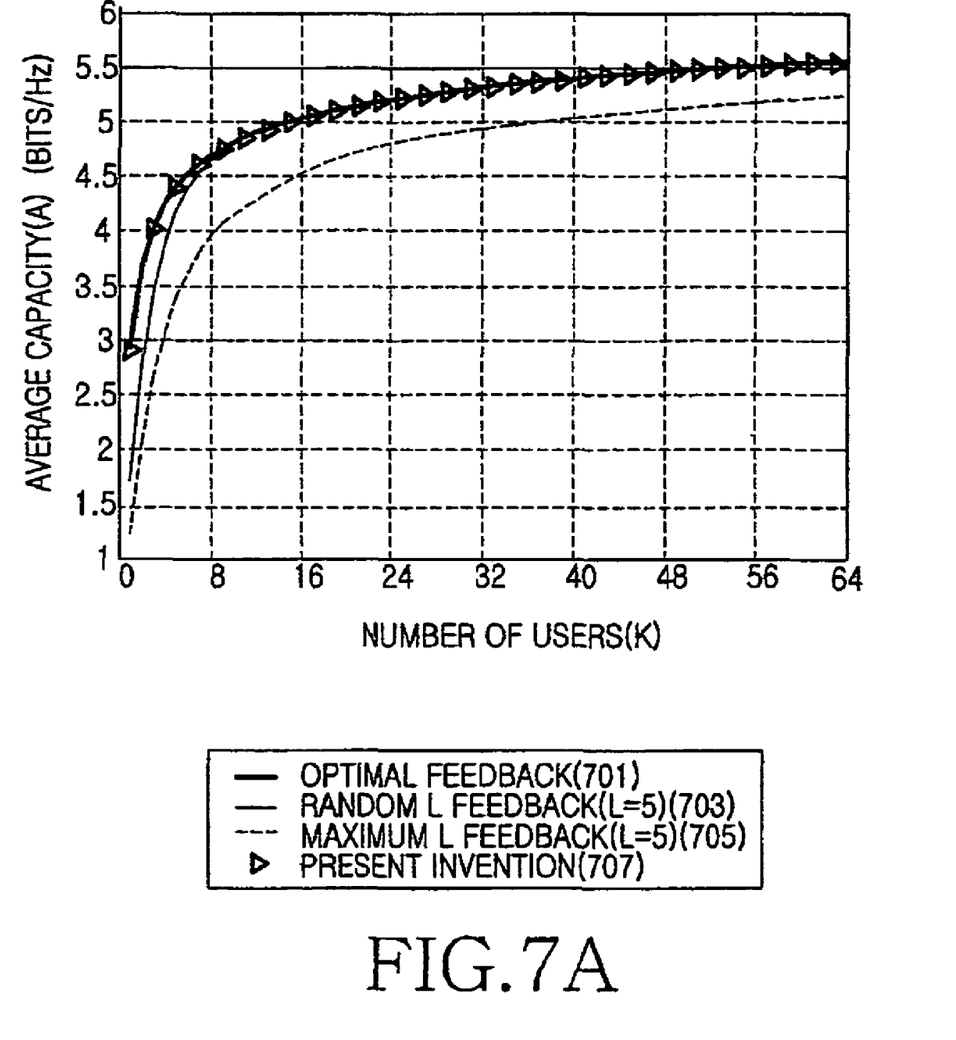
FIGS. 7A, 7B and 7C illustrate a performance change according to an exemplary embodiment of the present invention.
Figure 7B:
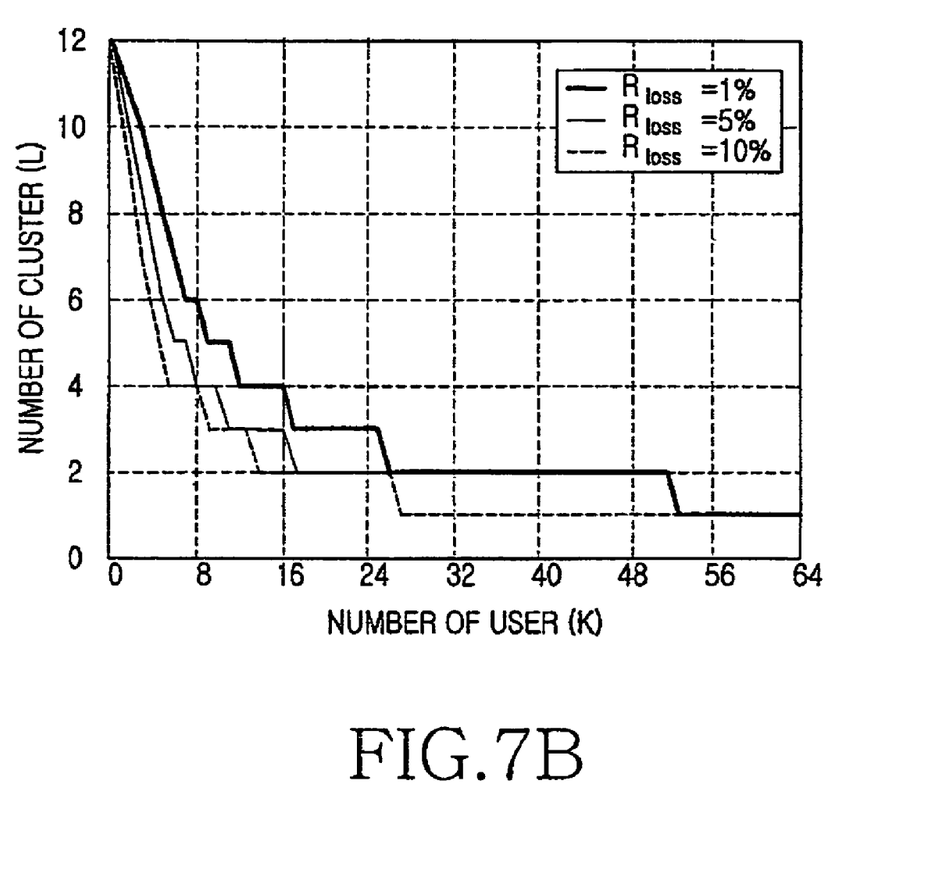
Figure 7C:
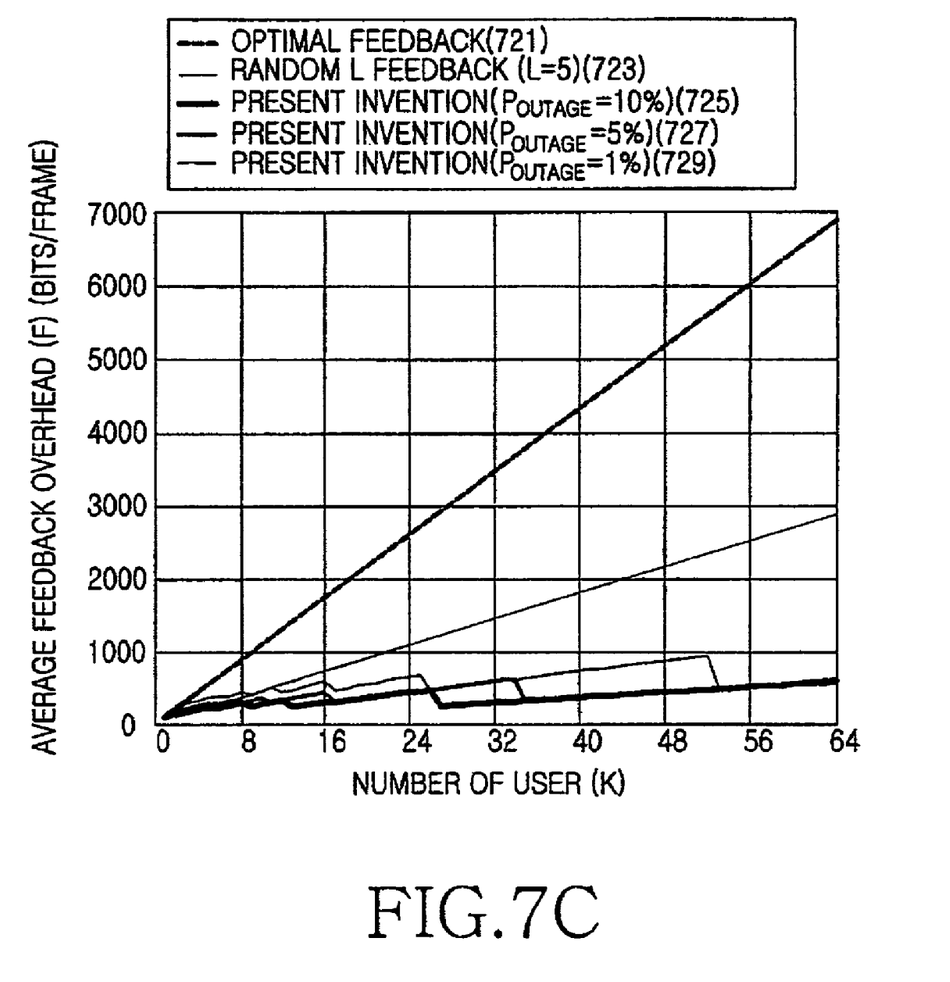

As constructed above, as operating the feedback channels not to raise the feedback channel overhead even when the number of the terminals to service increases, the base station can maximize the cell capacity as shown in FIGS. 7A, 7B and 7C.

FIGS. 7A, 7B and 7C are a graph showing a performance change according to an exemplary embodiment of the present invention.

Particularly, FIG. 7A shows the change of the cell capacity based on the number of terminals, FIG. 7B shows the change of the feedback channels allocated to the terminals based on the number of terminals, and FIG. 7C shows the change of the feedback overhead based on the number of terminals.

To represent the change of the cell capacity based on the number of terminals in FIG. 7A, a horizontal axis indicates the number of terminals and a vertical axis indicates an average capacity.

Without considering the feedback overhead, the feedback method 707 of the present invention can achieve the cell capacity substantially similar to the method 701 which feeds back every channel information and the method 705 which feeds back only the information of L-ary channels of the good channel conditions.

To represent the change of the feedback channels allocated to the terminals based on the number of terminals in FIG. 7B, a horizontal axis indicates the number of terminals and a vertical axis indicates the number of feedback channels.

When the feedback channels are configured according to the present invention, the base station allocates the feedback channels to the terminals by taking into account the feedback overhead limited by the system. Hence, as the number of the terminals allocated the feedback channels increases, the number of the feedback channels allocated to each terminal decreases.

Also, the less capacity loss, the greater number of the feedback channels allocated to each terminal.

To represent the change of the feedback overhead based on the number of terminals in FIG. 7C, a horizontal axis indicates the number of terminals and a vertical axis indicates the feedback overhead.

According to the method 721 which feeds back every channel information and the method 723 which feeds back L-ary channels, the greater number of the terminals to service, the greater feedback overhead.

In contrast, the methods 725, 727 and 729 which allocate the feedback channels in consideration of the feedback overhead limited by the system do not aggravate the feedback overhead even when the number of the terminals increases.

As above, as the base station allocates the feedback channels to each terminal, the feedback channels can be operated to maximize the cell capacity without increasing the feedback overhead.

In the light of the foregoing as set forth above, the base station of the wireless communication system transmits the feedback channel allocation information per user determined to maximize the cell capacity under the limited feedback overhead using the common control signal and the separate control signal. Therefore, the feedback channels can be operated without the loss of the cell capacity, the increase of the feedback overhead according to the increasing users can be prevented, and the overhead of the control signal for carrying the feedback channel allocation information can be reduced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for allocating feedback channels in a wireless communication system, the method comprising:
   determining a number of common feedback channels to be allocated commonly to a number of terminals based on the number of terminals assigned the common feedback channels, a number of data allocation units included in a data transmission interval, and a capacity loss in the wireless communication system due to a feedback channel allocation; and
   generating a feedback channel change information to change the number of the common feedback channels per terminal.

2. The method of claim 1, wherein determining the number of the common feedback channels comprises:
- determining a minimum number of the common feedback channels to be allocated commonly to the number of terminals;
- estimating a feedback overhead when the common feedback channels of the determined minimum number are allocated to the terminals; and
- updating the number of the common feedback channels when the estimate feedback overhead is not equal to a feedback overhead limited by a system.

3. The method of claim 1, wherein the number of the common feedback channels is determined based on the following equation:

$$L_{min} = \text{ceil}\left(\left(1 - (R_{loss})^{\frac{1}{N}}\right) \cdot N_C\right)$$

where $L_{min}$ denotes the number of the common feedback channels to be allocated to the terminals, $R_{loss}$ denotes a capacity loss due to the feedback channels allocated to the terminals, N denotes the number of terminals assigned the feedback channels, $N_c$ denotes the number of the data allocation units belonging to the data transmission interval, and ceil(ƒ(A)) denotes the smallest integer among integers greater than a function ƒ(A).

4. The method of claim 2, wherein updating the number of the common feedback channels comprises:
- calculating a common feedback channel change value when the estimated feedback overhead is not equal to the limited feedback overhead; and
- updating the number of the common feedback channels using the change value.

5. The method of claim 4, wherein the feedback channel variation is calculated based on the following equation:

$$L_R = \frac{F_{limit} - F(L_{min}, N)}{F_u}, \quad F_u = F(L=1, N=1)$$

where $L_R$ denotes a variation of the feedback channels, $F_{limit}$ denotes a minimum value of the feedback overhead, $F(L_{min}, N)$ denotes a feedback overhead when $L_{min}$-ary feedback channels are allocated to N-ary terminals, and $F_u$ denotes a feedback overhead when one feedback channel is allocated to one terminal.

6. The method of claim 1, wherein the feedback channel change information comprises increase/decrease information relating to the number of the common feedback channels with respect to each terminal.

7. The method of claim 1, wherein generating the feedback channel change information comprises:
- when there exists one or more feedback channels not included to the common feedback channels, generating a feedback channel change information to add one feedback channel to the common feedback channels starting from a terminal having the best channel condition in order.

8. The method of claim 1, wherein generating the feedback channel change information comprises:
- when there exists one or more feedback channels additionally included to the common feedback channels, generating a feedback channel change information to de-allocate one feedback channel from the common feedback channels starting from a terminal having the worst channel condition in order.

9. The method of claim 1, further comprising:
- transmitting an information relating to the number of the common feedback channels to the terminals; and
- transmitting the feedback channel change information generated for each terminal to the terminals respectively.

10. A method for transmitting channel information in a wireless communication system, the method comprising:
- confirming a feedback channel information from a broadcast signal received from a serving base station;
- checking whether a feedback channel change information is received from the serving base station or not;
- when receiving the feedback channel change information, confirming feedback channels allocated by the serving base station using the feedback channel information and the feedback channel change information, wherein the feedback channels are common feedback channels allocated commonly to a number of terminals and a number of the common feedback channels allocated is determined based on the number of terminals assigned the common feedback channels, a number of data allocation units included in a data transmission interval, and a capacity loss in the wireless communication system due to a feedback channel allocation; and
- transmitting a channel information to the serving base station over the feedback channels.

11. The method of claim 10, further comprising:
- when not receiving the feedback channel change information, not transmitting the channel information to the serving base station.

12. An apparatus for allocating feedback channels in a wireless communication system, comprising:
- a feedback controller configured to determine a number of common feedback channels to be allocated commonly to a number of terminals based on the number of terminals assigned the common feedback channels, a number of data allocation units included in a data transmission interval, and a capacity loss in the wireless communication system due to a feedback channel allocation, and generate a feedback channel change information to change the number of the common feedback channels per terminal; and
- a transmitter configured to transmit the number of the common feedback channels and the feedback channel change information to the terminals.

13. The apparatus of claim 12, wherein the feedback controller is further configured to determine a minimum number of the common feedback channels to be allocated commonly to a number of terminals.

14. The apparatus of claim 12, wherein the feedback controller is further configured to determine the number of the common feedback channels based on the following equation:

$$L_{min} = \text{ceil}\left(\left(1 - (R_{loss})^{\frac{1}{N}}\right) \cdot N_C\right)$$

where $L_{min}$ denotes the number of the common feedback channels to be allocated to the terminals, $R_{loss}$ denotes a capacity loss due to the feedback channels allocated to the terminals, N denotes the number of terminals assigned the feedback channels, $N_c$ denotes the number of the data allocation units belonging to the data transmission interval, and ceil(ƒ(A)) denotes the smallest integer among integers greater than a function ƒ(A).

15. The apparatus of claim 13, wherein the feedback controller is further configured to update the number of the common feedback channels when a feedback overhead when the common feedback channels of the minimum number are allocated to the terminals is not equal to a feedback overhead limited by a system.

16. The apparatus of claim 15, wherein the feedback controller is further configured to update the number of the common feedback channels using a common feedback channel change value calculated based on the following equation:

$$L_R = \frac{F_{limit} - F(L_{min}, N)}{F_u}, F_u = F(L = 1, N = 1)$$

where $L_R$ denotes a variation of the feedback channel, $F_{limit}$ denotes a minimum value of the feedback overhead, $F(L_{min}, N)$ denotes a feedback overhead when $L_{min}$-ary feedback channels are allocated to N-ary terminals, and $F_u$ denotes a feedback overhead when one feedback channel is allocated to one terminal.

17. The apparatus of claim 12, wherein, when there exist one or more feedback channels not included to the common feedback channels, the feedback controller is further configured to generate a feedback channel change information to add one feedback channel to the common feedback channels starting from a terminal having the best channel condition in order.

18. The apparatus of claim 12, wherein, when there exist one or more feedback channels additionally included to the determined common feedback channels, the feedback controller is further configured to generate a feedback channel change information to de-allocate one feedback channel from the common feedback channels starting from a terminal having the worst channel condition in order.

19. The apparatus of claim 12, wherein the transmitter is further configured to broadcast an information relating to the number of the common feedback channels to the terminals, and transmits the feedback channel information generated for each terminal to the terminals respectively.

20. An apparatus for feeding back channel state information at a receiving stage in a wireless communication system, comprising:
a receiver configured to receive a signal from a serving base station;
a channel estimator configured to estimate a channel using the signal received through the receiver;
a controller configured to confirm feedback channels using a feedback channel information of a broadcast signal received from the receiver and a feedback channel change information of a control signal, and control a transmission of a channel information over the feedback channels, wherein the feedback channels are common feedback channels allocated commonly to a number of terminals and a number of the common feedback channels allocated is determined based on the number of terminals assigned the common feedback channels, a number of data allocation units included in a data transmission interval, and a capacity loss in the wireless communication system due to a feedback channel allocation; and
a transmitter configured to transmit the channel information to the serving base station under the control of the controller.

21. The apparatus of claim 20, wherein, when not receiving the control signal, the controller is further configured to inhibit the transmission of the channel information.

* * * * *